United States Patent
Kasuga et al.

(10) Patent No.: US 9,983,544 B2
(45) Date of Patent: May 29, 2018

(54) IMAGE READING APPARATUS AND IMAGE FORMATION SYSTEM

(71) Applicant: Konica Minolta, Inc., Chiyoda-ku, Tokyo (JP)

(72) Inventors: Akio Kasuga, Tokyo (JP); Akihiko Ooishi, Tokyo (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days. days.

(21) Appl. No.: 15/372,475

(22) Filed: Dec. 8, 2016

(65) Prior Publication Data
US 2017/0171417 A1    Jun. 15, 2017

(30) Foreign Application Priority Data
Dec. 15, 2015    (JP) .................................. 2015-244238

(51) Int. Cl.
| | |
|---|---|
| G03G 21/20 | (2006.01) |
| G03G 15/00 | (2006.01) |
| H04N 1/00 | (2006.01) |
| H04N 1/028 | (2006.01) |
| H04N 1/04 | (2006.01) |
| H04N 1/29 | (2006.01) |

(52) U.S. Cl.
CPC ....... *G03G 21/206* (2013.01); *G03G 15/5025* (2013.01); *G03G 15/5062* (2013.01); *H04N 1/00981* (2013.01); *H04N 1/0282* (2013.01); *H04N 1/0464* (2013.01); *H04N 1/29* (2013.01); *H04N 2201/0094* (2013.01)

(58) Field of Classification Search
None
See application file for complete search history.

(56) References Cited

U.S. PATENT DOCUMENTS

| | | |
|---|---|---|
| 9,357,095 B2 | 5/2016 | Enomoto et al. |
| 2010/0177362 A1 | 7/2010 | Kim |

(Continued)

FOREIGN PATENT DOCUMENTS

| | | |
|---|---|---|
| JP | 2011-188166 A | 9/2011 |
| JP | 2012093391 A | 5/2012 |

(Continued)

OTHER PUBLICATIONS

Extended European Search Report dated May 4, 2017, issued by the European Patent Office in corresponding European Application No. EP 16201019.3 (8 pages).

(Continued)

*Primary Examiner* — Thomas Giampaolo, II
(74) *Attorney, Agent, or Firm* — Buchanan Ingersoll & Rooney PC

(57) ABSTRACT

An image reading apparatus includes: a light emission section including a light emitting element, and a light guiding member configured to irradiate a sheet with light emitted from the light emitting element; a reading section configured to read an image formed on the sheet; a heat dissipation section configured to dissipate heat of the light emitting element; and a cooling section configured to cool the heat dissipation section, in which the light emitting element and the heat dissipation section are disposed at positions outside a sheet passing region of the sheet in the width direction.

10 Claims, 6 Drawing Sheets

(56) References Cited

U.S. PATENT DOCUMENTS

| | | | |
|---|---|---|---|
| 2012/0099873 A1* | 4/2012 | Ninomiya | G03G 15/04036 399/15 |
| 2013/0314756 A1* | 11/2013 | Amemiya | F21V 13/04 358/497 |
| 2014/0192375 A1* | 7/2014 | Morita | H04N 1/00045 358/1.13 |
| 2014/0355078 A1* | 12/2014 | Fujiuchi | H04N 1/02825 358/474 |

FOREIGN PATENT DOCUMENTS

| | | |
|---|---|---|
| JP | 2013051555 A | 3/2013 |
| JP | 2014-90281 A | 5/2014 |
| JP | 2014-144627 A | 8/2014 |
| JP | 2015030221 A | 2/2015 |
| WO | 2015/059997 A | 4/2015 |

OTHER PUBLICATIONS

Notice of Reasons for Rejection dated Dec. 19, 2017, by the Japanese Patent Office in corresponding Japanese Patent Application No. 2015-244238 and English translation of the Office Action (16 pages).

Notice of Reasons for Rejection dated Feb. 27, 2018, by the Japanese Patent Office in corresponding Japanese Patent Application No. 2015-244238 and English translation of the Office Action (17 pages).

* cited by examiner

IMAGE READING APPARATUS AND IMAGE FORMATION SYSTEM

CROSS REFERENCE TO RELATED APPLICATIONS

This application is entitled to and claims the benefit of Japanese Patent Application No. 2015-244238, filed on Dec. 15, 2015, the disclosure of which including the specification, drawings and abstract is incorporated herein by reference in its entirety.

BACKGROUND OF THE INVENTION

1. Field of the Invention

The present invention relates to an image reading apparatus and an image formation system.

2. Description of Related Art

In general, an electrophotographic image forming apparatus (such as a printer, a copy machine, and a fax machine) is configured to irradiate (expose) a charged photoconductor drum (image bearing member) with (to) laser light based on image data to form an electrostatic latent image on the surface of the photoconductor. The electrostatic latent image is then visualized by supplying toner from a developing device to the photoconductor drum on which the electrostatic latent image is formed, whereby a toner image is formed. Further, the toner image is directly or indirectly transferred to a sheet, and then heat and pressure are applied to the sheet at a fixing nip to form a toner image on the sheet.

Practical use of image formation systems in which the above-mentioned image forming apparatus and an image reading apparatus are connected with each other has been facilitated. The image reading apparatus reads a toner image formed on a sheet, and feeds back the read information to the image forming apparatus so as to correct the color, position, multiplying factor or the like of the toner image. In the image formation system, before the toner image intended by the user is output to a sheet, correction of the image quality is performed based on the information read by the image reading apparatus.

To be more specific, the correction of the image quality is performed in the image forming apparatus by feedback of the correction value calculated from the information of the image position and the color read by the image reading apparatus to the image forming apparatus. In this manner, at the time when the toner image intended by the user is output to a sheet, automatic correction of the image quality can be performed with high efficiency based on the read information of the reading section.

Incidentally, since the light emitting element in the reading section emits light or generates heat when a current is supplied to the element, the heat generated at the time of light emission is dissipated to the surroundings whose temperature is lower than that of the element. In this manner, the temperature of the light emitting element is reduced, and the light emission performance of the light emitting element is maintained.

In addition, in the reading section, a sheet having passed through the fixing nip is conveyed, and as a result the temperature in the apparatus tends to be increased with the heat of the sheet. When the temperature of the region around the light emitting element increases with the increased temperature in the apparatus, dissipation of the heat generated by the light emitting element becomes difficult. When the heat-dissipation performance of the light emitting element is low, the temperature of the light emitting element is not easily reduced, and the temperature of the light emitting element is saturated, thus degrading light emission performance. Therefore, it is desirable to cool the light emitting element such that the light emission performance of the light emitting element is maintained.

For example, Japanese Patent Application Laid-Open No. 2012-93391 discloses a configuration in which a fan for introducing external air, and a duct for the air introduced by the fan are provided for the purpose of reducing the temperature in the apparatus. With this configuration, the light emission performance of the light emitting element can be maintained by cooling the light emitting element with the external air.

However, when a fan for introducing the external air and a duct are provided as in the configuration disclosed in Japanese Patent Application Laid-Open No. 2012-93391, the size of the apparatus increases as a whole. To be more specific, for example, in the case of an array-type configuration in which a plurality of light emitting elements are disposed side by side in the sheet width direction, a sheet being conveyed and the light emitting element face each other, and the light emission ability of the light emitting elements is easily reduced under the influence of the heat dissipated from the sheet having passed through the fixing nip, and therefore the wind power of the fan is required to be increased to compensate the reduction of the light emission ability. Since the size of the cooling members such as the fan is required to be increased, the apparatus size may be further increased.

In addition, in the case of the array-type configuration, the light emitting element and a sheet being conveyed face each other, and therefore, when the wind for cooling the light emitting element is applied to the light emitting element, the wind may become a resistance against the conveyance of the sheet facing the light emitting element depending on the direction of the wind. When the duct is configured such that it has no influence on the feeding path, the apparatus size may be further increased.

In particular, in the case where reading sections configured to read toner images printed on the both sides of a sheet with high efficiency and disposed at positions corresponding to the front surface and the rear surface of the sheet such that the read information can be fed back to the image forming apparatus are provided in a configuration for double-sided printing, a duct is required to be provided for each reading section, and the apparatus size is further increased.

SUMMARY OF THE INVENTION

An object of the present invention is to provide an image reading apparatus and an image formation system which can suppress reduction of the light emission performance of the light emitting element while suppressing increase in apparatus size.

To achieve the abovementioned object, an image reading apparatus reflecting one aspect of the present invention includes: a light emission section including a light emitting element configured to emit light, and a light guiding member configured to irradiate a sheet with light emitted from the light emitting element such that a quantity of the light is uniform in a width direction of the sheet; a reading section configured to emit light from the light emission section to read an image formed on the sheet; a heat dissipation section configured to dissipate heat of the light emitting element; and a cooling section configured to cool the heat dissipation section. The light emitting element and the heat dissipation section are disposed at positions outside a sheet passing region of the sheet in the width direction.

Desirably, in the image reading apparatus, the cooling section cools the heat dissipation section from a side opposite to a conveyance surface of the sheet with respect to the light emission section.

Desirably, in the image reading apparatus, wherein the light emitting element is disposed at each end portion of the light guiding member in the width direction.

Desirably, in the image reading apparatus, the cooling section cools the heat dissipation section by use of air in the image reading apparatus.

Desirably, the image reading apparatus further includes: a conveyance member configured to convey the sheet to a reading position in the reading section. The light emitting element and the heat dissipation section are disposed at positions outside the conveyance member in the width direction.

Desirably, the image reading apparatus further includes: a backing member disposed to face the reading section on a side opposite to the reading section with respect to a conveyance surface of the sheet. The light emitting element and the heat dissipation section are disposed at positions outside the backing member in the width direction.

Desirably, in the image reading apparatus, the reading section includes: a first reading section configured to read an image formed on a first surface of the sheet; and a second reading section configured to read an image formed on a second surface of the sheet, the second surface being opposite to the first surface.

Desirably, in the image reading apparatus, the light emission section, the heat dissipation section and the cooling section are provided in each of the first reading section and the second reading section.

To achieve the abovementioned object, an image formation system reflecting one aspect of the present invention includes: an image forming apparatus configured to form an image on a sheet; and the image reading apparatus that reads an image of the sheet formed by the image forming apparatus.

DESCRIPTION OF THE PREFERRED EMBODIMENTS

Figure 1:
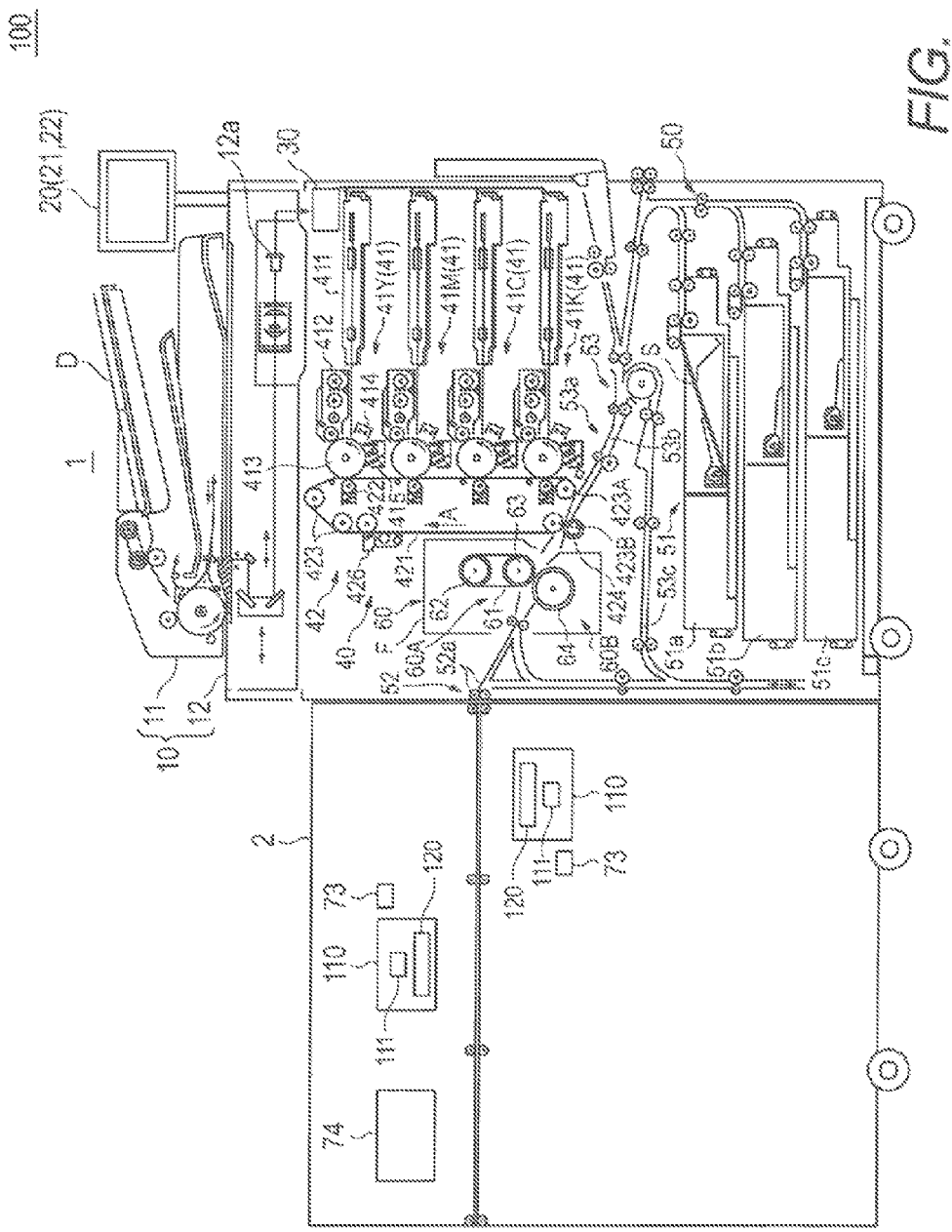
FIG. 1 schematically illustrates a general configuration of an image formation system according to an embodiment.
Figure 2:
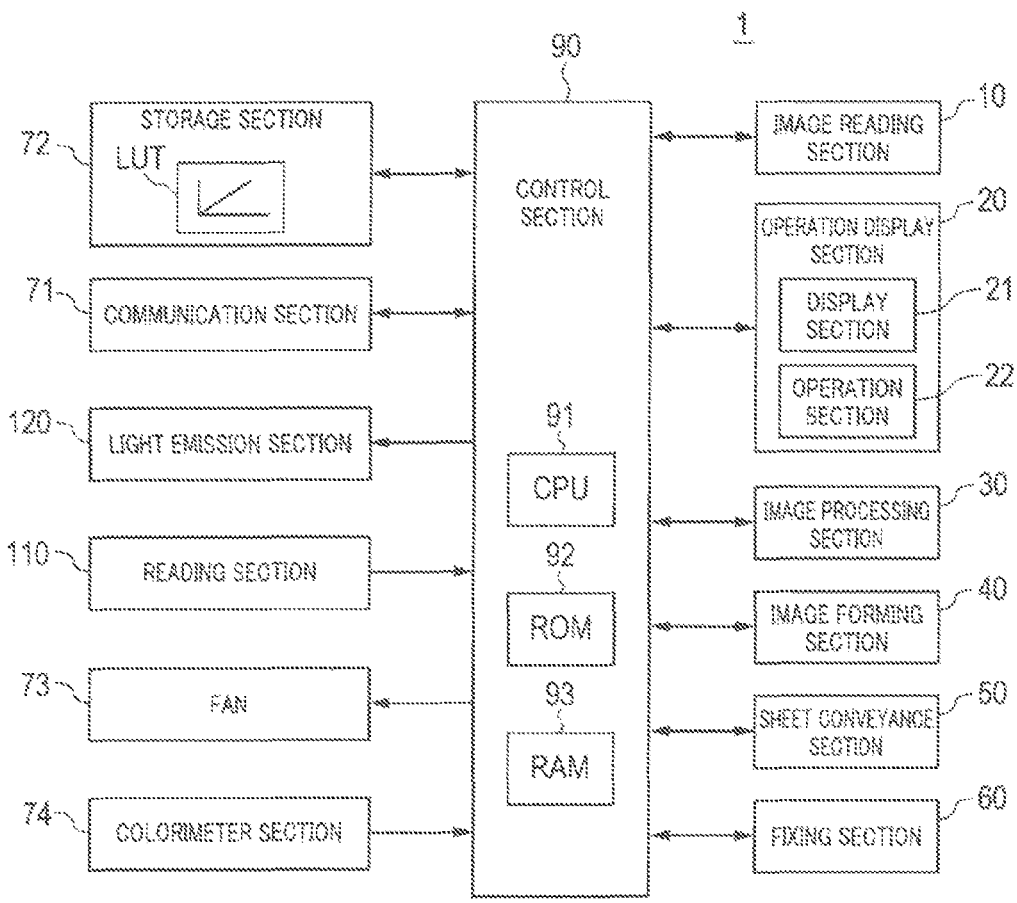
FIG. 2 illustrates a principal part of a control system of the image forming apparatus according to the embodiment.

In the following, the present embodiment is described in detail with reference to the drawings. FIG. 1 schematically illustrates a general configuration of image forming system 100 according to an embodiment of the present invention. FIG. 2 illustrates a principal part of a control system of image forming apparatus 1 according to the embodiment.

As illustrated in FIG. 1, image formation system 100 includes image forming apparatus 1 and image reading apparatus 2 which are connected together in this order from the upstream side in the conveyance direction of sheet S.

Image forming apparatus 1 illustrated in FIGS. 1 and 2 is a color image forming apparatus of an intermediate transfer system using electrophotographic process technology. That is, image forming apparatus 1 primary-transfers toner images of yellow (Y), magenta (M), cyan (C), and black (K) formed on photoconductor drums 413 to intermediate transfer belt 421, and superimposes the toner images of the four colors on one another on intermediate transfer belt 421. Then, image forming apparatus 1 secondary-transfers the resultant image to sheet S, to thereby form an image.

A longitudinal tandem system is adopted for image forming apparatus 1. In the longitudinal tandem system, respective photoconductor drums 413 corresponding to the four colors of YMCK are placed in series in the travelling direction (vertical direction) of intermediate transfer belt 421, and the toner images of the four colors are sequentially transferred to intermediate transfer belt 421 in one cycle.

Image forming apparatus 1 includes image reading section 10, operation display section 20, image processing section 30, image forming section 40, sheet conveyance section 50, fixing section 60 and control section 90.

Control section 90 includes central processing unit (CPU) 91, read only memory (ROM) 92, random access memory (RAM) 93 and the like. CPU 91 reads a program suited to processing contents out of ROM 92, develops the program in RAM 93, and integrally controls an operation of each block of image forming apparatus 1 in cooperation with the developed program. At this time, CPU 101 refers to various kinds of data stored in storage section 72. Storage section 72 is composed of, for example, a non-volatile semiconductor memory (so-called flash memory) or a hard disk drive.

Control section 90 transmits and receives various data to and from an external apparatus (for example, a personal computer) connected to a communication network such as a local area network (LAN) or a wide area network (WAN), through communication section 71. Control section 90 receives, for example, image data (input image data) transmitted from the external apparatus, and performs control to form an image on sheet S on the basis of the image data. Communication section 71 is composed of, for example, a communication control card such as a LAN card.

Image reading section 10 includes auto document feeder (ADF) 11, document image scanning device 12 (scanner), and the like.

Auto document feeder 11 causes a conveyance mechanism to feed document D placed on a document tray, and sends out document D to document image scanner 12. Auto document feeder 11 enables images (even both sides thereof) of a large number of documents D placed on the document tray to be successively read at once.

Document image scanner 12 optically scans a document fed from auto document feeder 11 to its contact glass or a document placed on its contact glass, and brings light reflected from the document into an image on the light receiving surface of charge coupled device (CCD) sensor 12a, to thereby read the document image. Image reading section 10 generates input image data on the basis of a reading result provided by document image scanner 12.

Image processing section 30 performs predetermined image processing on the input image data.

Operation display section 20 includes, for example, a liquid crystal display (LCD) provided with a touch panel, and functions as display section 21 and operation section 22. Display section 21 displays various operation screens, image conditions, operating statuses of functions, and the like in accordance with display control signals received from control section 90. Operation section 22 includes various operation keys such as numeric keys and a start key, receives various input operations performed by a user, and outputs operation signals to control section 90.

Image processing section 30 includes a circuit that performs a digital image process suited to initial settings or user settings on the input image data, and the like. For example, image processing section 30 performs tone correction on the basis of tone correction data (tone correction table), under the control of control section 90. In addition to the tone correction, image processing section 30 also performs various correction processes such as color correction and shading correction as well as a compression process, on the input image data. Image forming section 40 is controlled on the basis of the image data that has been subjected to these processes.

Image forming section 40 includes: image forming units 41Y, 41M, 41C, and 41K that form images of colored toners of a Y component, an M component, a C component, and a K component on the basis of the input image data; intermediate transfer unit 42; and the like.

Image forming units 41Y, 41M, 41C, and 41K for the Y component, the M component, the C component, and the K component have similar configurations. For ease of illustration and description, common elements are denoted by the same reference signs. Only when elements need to be discriminated from one another, Y, M, C, or K is added to their reference signs. In FIG. 1, reference signs are given to only the elements of image forming unit 41Y for the Y component, and reference signs are omitted for the elements of other image forming units 41M, 41C, and 41K.

Image forming unit 41 includes exposing device 411, developing device 412, photoconductor drum 413, charging device 414, drum cleaning device 415 and the like.

Photoconductor drum 413 is a negative-charging type organic photoconductor (OPC) having photoconductivity in which an undercoat layer (UCL), a charge generation layer (CGL), and charge transport layer (CTL) are sequentially stacked on a peripheral surface of a conductive cylindrical body made of aluminum (aluminum raw pipe), for example.

Charging device 414 causes corona discharge to evenly negatively charge the surface of photoconductor drum 413 having photoconductivity.

Exposure device 411 is composed of, for example, a semiconductor laser, and configured to irradiate photoconductor drum 413 with laser light corresponding to the image of each color component. The positive charge is generated in the charge generation layer of photoconductor drum 413 and is transported to the surface of the charge transport layer, whereby the surface charge (negative charge) of photoconductor drum 413 is neutralized. An electrostatic latent image of each color component is formed on the surface of photoconductor drum 413 by the potential difference from its surroundings.

Developing device 412 is a developing device of a two-component reverse type, and attaches toners of respective color components to the surface of photoconductor drums 413, and visualizes the electrostatic latent image to form a toner image. Developing device 412 forms a toner image on the surface of photoconductor drum 413 by supplying the toner included in the developer to photoconductor drum 413.

Drum cleaning device 415 includes a drum cleaning blade that is brought into sliding contact with the surface of photoconductor drum 413, and removes residual toner that remains on the surface of photoconductor drum 413 after the primary transfer.

Intermediate transfer unit 42 includes intermediate transfer belt 421, primary transfer roller 422, a plurality of support rollers 423, secondary transfer roller 424, belt cleaning device 426 and the like.

Intermediate transfer belt 421 is composed of an endless belt, and is stretched around the plurality of support rollers 423 in a loop form. At least one of the plurality of support rollers 423 is composed of a driving roller, and each of the others is composed of a driven roller. When driving roller rotates, intermediate transfer belt 421 travels in direction A at a constant speed.

Intermediate transfer belt 421 has conductivity and elasticity, and includes a high resistance layer on the surface thereof. Intermediate transfer belt 421 is rotationally driven by a control signal from control section 90.

Primary transfer rollers 422 are disposed on the inner periphery side of intermediate transfer belt 421 to face photoconductor drums 413 of respective color components. Primary transfer rollers 422 are brought into pressure contact with photoconductor drums 413 with intermediate transfer belt 421 therebetween, whereby a primary transfer nip for transferring a toner image from photoconductor drums 413 to intermediate transfer belt 421 is formed.

Secondary transfer roller 424 is disposed to face backup roller 423B disposed on the downstream side in the belt travelling direction relative to driving roller 423A, at a position on the outer peripheral surface side of intermediate transfer belt 421. Secondary transfer roller 424 is brought into pressure contact with backup roller 423B with intermediate transfer belt 421 therebetween, whereby a secondary transfer nip for transferring a toner image from intermediate transfer belt 421 to sheet S is formed.

Belt cleaning device 426 removes transfer residual toner which remains on the surface of intermediate transfer belt 421 after a secondary transfer.

When intermediate transfer belt 421 passes through the primary transfer nip, the toner images on photoconductor drums 413 are sequentially primary-transferred to intermediate transfer belt 421. To be more specific, a primary transfer bias is applied to primary transfer rollers 422, and an electric charge of the polarity opposite to the polarity of the toner is applied to the rear side, that is, a side of intermediate transfer belt 421 that makes contact with primary transfer rollers 422 whereby the toner image is electrostatically transferred to intermediate transfer belt 421.

Thereafter, when sheet S passes through the secondary transfer nip, the toner image on intermediate transfer belt 421 is secondary-transferred to sheet S.

To be more specific, a secondary transfer bias is applied to backup roller 423B, and an electric charge of the polarity identical to the polarity of the toner is applied to the front side, that is, a side of sheet S that makes contact with intermediate transfer belt 421 whereby the toner image is electrostatically transferred to sheet S.

Fixing section 60 includes upper fixing section 60A having a fixing side member disposed on a fixing surface side, that is, a side of the surface on which a toner image is formed, of sheet S, lower fixing section 60B having a rear side supporting member disposed on the rear surface side, that is, a side of the surface opposite to the fixing surface, of sheet S, and the like. The rear side supporting member is brought into pressure contact with the fixing side member, whereby a fixing nip for conveying sheet S in a tightly sandwiching manner is formed.

At the fixing nip, fixing section 60 applies heat and pressure to sheet S on which a toner image has been secondary-transferred to fix the toner image on sheet S. Fixing section 60 is disposed as a unit in fixing part F. In addition, fixing part F may be provided with an air-separating unit that blows air to separate sheet S from the fixing side member or the rear side supporting member.

Upper side fixing section 60A includes endless fixing belt 61, heating roller 62 and fixing roller 63, which serve as a fixing side member. Fixing belt 61 is installed in a stretched state between heating roller 62 and fixing roller 63.

Heating roller 62 incorporates a heating source (halogen heater) and applies heat to fixing belt 61. The heating source applies heat to heating roller 62, and as a result, fixing belt 61 is heated.

Fixing roller 63 is driven into rotation in clockwise direction by control section 90. When fixing roller 63 rotates, fixing belt 61 and heating roller 62 rotate in the clockwise direction to follow the rotation of fixing roller 63.

Lower fixing section 60B includes pressure roller 64 that is the rear side supporting member. Together with fixing belt 61, pressure roller 64 forms a fixing nip for conveying sheet S in a sandwiching manner. Pressure roller 64 is driven into rotation in the counterclockwise direction by control section 90.

Sheet conveyance section 50 includes sheet feeding section 51, sheet ejection section 52, conveyance path section 53 and the like. Three sheet feed tray units 51a to 51c included in sheet feeding section 51 store sheets S (standard sheets, special sheets) discriminated on the basis of the basis weight, the size, and the like, for each type set in advance.

Conveyance path section 53 includes a plurality of conveyance roller pairs including registration rollers pair 53a, normal conveyance path 53b that conveys sheet S through image forming section 40 and fixing section 60 and ejects sheet S to sheet tray 54 of image forming apparatus 1, and inversion conveyance path 53c that inverts sheet S having passed through fixing section 60 and thereafter conveys sheet S again into normal conveyance path 53b on the upstream of image forming section 40. In the case of double-sided printing, a toner image is formed on the front surface of sheet S when sheet S passes through first normal conveyance path 53b, and a toner image is formed on the rear surface of sheet S when sheet S passes through normal conveyance path 53b after passing through invert conveyance path 53c.

Sheets S stored in sheet tray units 51a to 51c are output one by one from the uppermost, and conveyed to image forming section 40 by conveyance path section 53. At this time, the registration roller section in which the pair of registration rollers 53a are arranged corrects skew of sheet S fed thereto, and the conveyance timing is adjusted. Then, in image forming section 40, the toner image on intermediate transfer belt 421 is secondary-transferred to one side of sheet S at one time, and a fixing process is performed in fixing section 60. Sheet S on which an image has been formed is ejected out of the image forming apparatus by sheet ejection section 52 including sheet ejection rollers 52a.

Image reading apparatus 2 reads a toner image (image) formed on sheet S ejected from image forming apparatus 1, and feeds back the read information to control section 90 of image forming apparatus 1. Control section 90 performs correction of the toner image based on the information fed back from image reading apparatus 2 such that the color, position, multiplying factor and the like of the toner image are corrected, for example.

Image reading apparatus 2 includes two reading sections 110 that are capable of reading the position and the density of the toner image formed on the both sides of sheet S, fans 73 that are provided for respective reading sections 110, and colorimeter section 74 that is capable of reading the color, brightness and the saturation of a toner image.

Fan 73 is a cooling section for cooling light emission section 120 described later. Colorimeter section 74 is disposed on the downstream side relative to reading section 110 in the conveyance direction, and outputs information read from passing sheet S to control section 90.

In the apparatus, reading section 110 is provided on the lower side and the upper side of the conveyance path of sheet S. Lower side reading section 110 corresponds to the "first reading section" of the embodiment of the present invention and upper side reading section 110 corresponds to the "second reading section" of the embodiment of the present invention.

Lower side reading section 110 reads information of a toner image (image) formed on a first surface that is the surface of sheet S facing the lower side in the apparatus. Upper side reading section 110 reads information of a toner image (image) formed on a second surface that is the surface of sheet S facing the upper side in the apparatus. Each reading section 110 outputs the read information to control section 90.

Since reading sections 110 corresponding to respective surfaces of sheet S are provided, sheet S subjected to double-sided printing can be read with high efficiency. In FIG. 1, upper side reading section 110 is disposed on the downstream side relative to lower side reading section 110 in the conveyance direction.

Reading section 110 includes imaging member 111 such as a charge coupled device (CCD), and light emission section 120 including a light emitting element such as a light emitting diode (LED). Reading section 110 irradiates a toner image formed on sheet S with light of the light emitting element, and reads reflection light from the irradiated portion of sheet S by use of imaging member 111 to read the information of the toner image.

Figure 3:
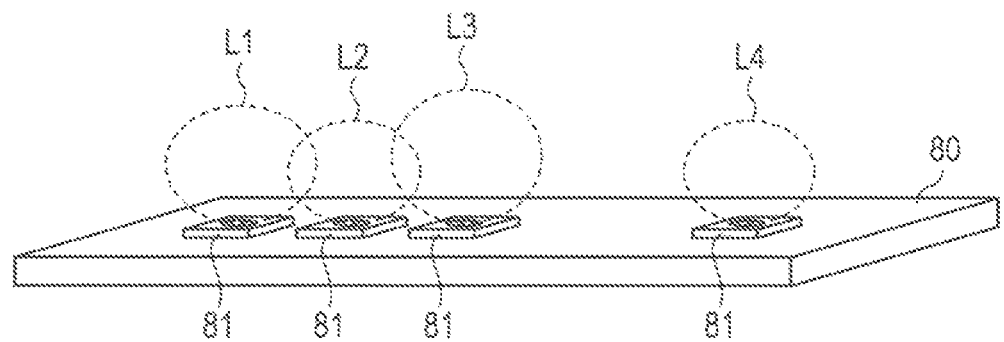
FIG. 3 illustrates a state where a light emitting element emits light in an array-type configuration.

Incidentally, in the case where an array-type configuration in which a plurality of the light emitting elements are disposed side by side in the width direction of sheet S is employed, the non-uniformity of the light quantity of the light emitting elements may be large. FIG. 3 illustrates a state where light emitting elements of an array-type emit light.

As illustrated in FIG. 3, in the light emission section of the array-type, a plurality of light emitting elements 81 are disposed side by side on substrate 80. It is to be noted that, in FIG. 3, the direction in which light emitting elements 81 are arranged is the sheet width direction, and only four light emitting elements 81 are shown for the convenience of description.

Figure 4:
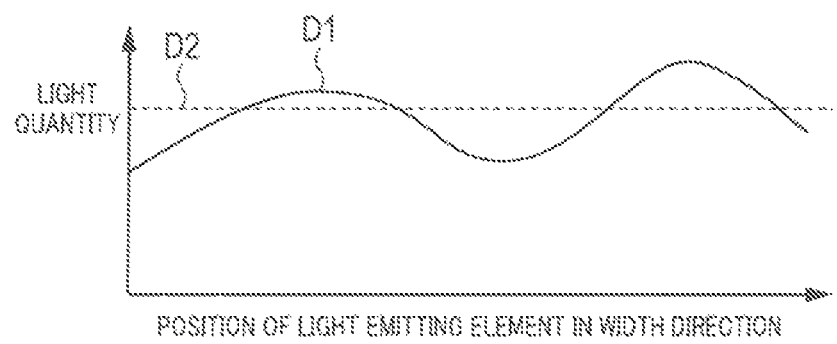
FIG. 4 shows a relationship between the position of the light emitting element in the sheet width direction and variation of the light quantity of the light emitting element.

In such an array-type configuration, a large number of light emitting elements 81 are used, and consequently the light quantities L1, L2, L3 and L4 of light emitting elements 81 tend to be different from each other. FIG. 4 shows a relationship between the position of light emitting element 81 in the sheet width direction and variation of the light quantity of light emitting element 81.

As illustrated in FIG. 4, the light quantity of light emitting elements 81 may vary in the width direction as indicated by solid line D1, for example. In this case, to set the light quantity of light emitting element 81 to the light quantity indicated by broken line D2, which is a target value, correction processes which are different among the positions in the width direction of sheet S are required to be performed.

Figure 5:
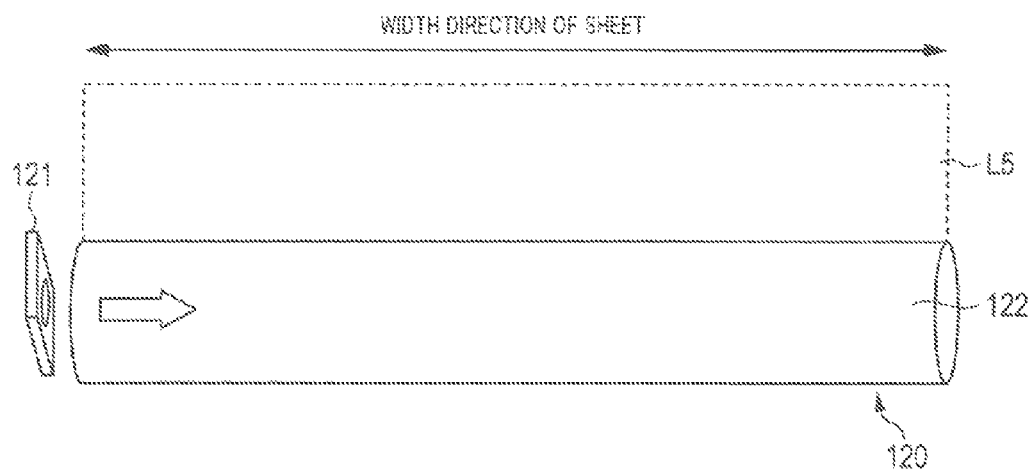
FIG. 5 is an enlarged view of a region around the light emitting element in the light emission section.

In view of this, in the present embodiment, light emission section 120 of reading section 110 is of a light-guiding rod type as illustrated in FIG. 5, not the array-type. To be more specific, light emission section 120 includes light emitting element 121 that emits light, and light guiding member 122 that extends in the sheet width direction.

As with the above-described array-type configuration, light emitting element 121 is an LED or the like, and is disposed at each end portion of light guiding member 122 in the width direction.

Light guiding member 122 is composed of a resin member such as acrylic resin or prism glass, and is disposed to face a sheet conveyed in the apparatus. The light from light emitting element 121 is incident on the end portions of light guiding member 122, and light guiding member 122 applies the light to a sheet with light quantity L5 which is uniform in the width direction. In this manner, non-uniformity of the light quantity of light emitting element 121 can be reduced at each position in the sheet width direction.

Figure 6:
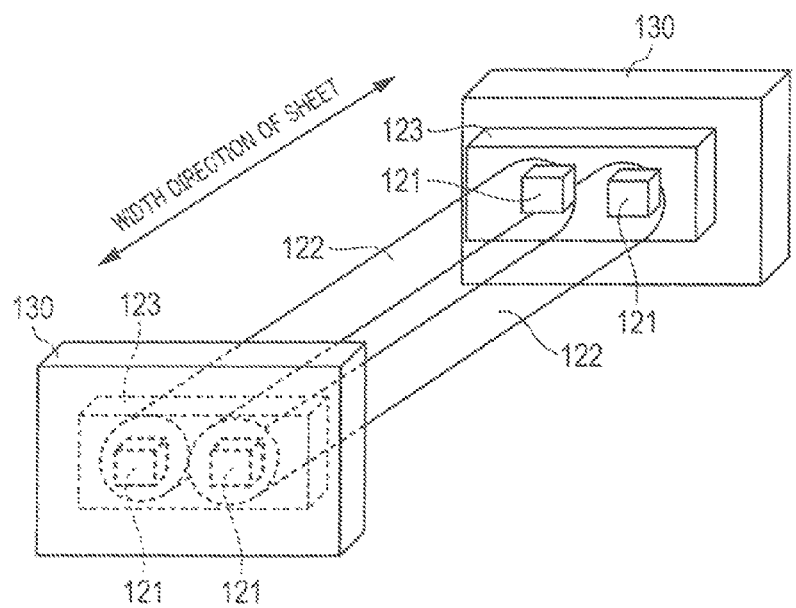
FIG. 6 is a perspective view of the light emission section.
Figure 7:
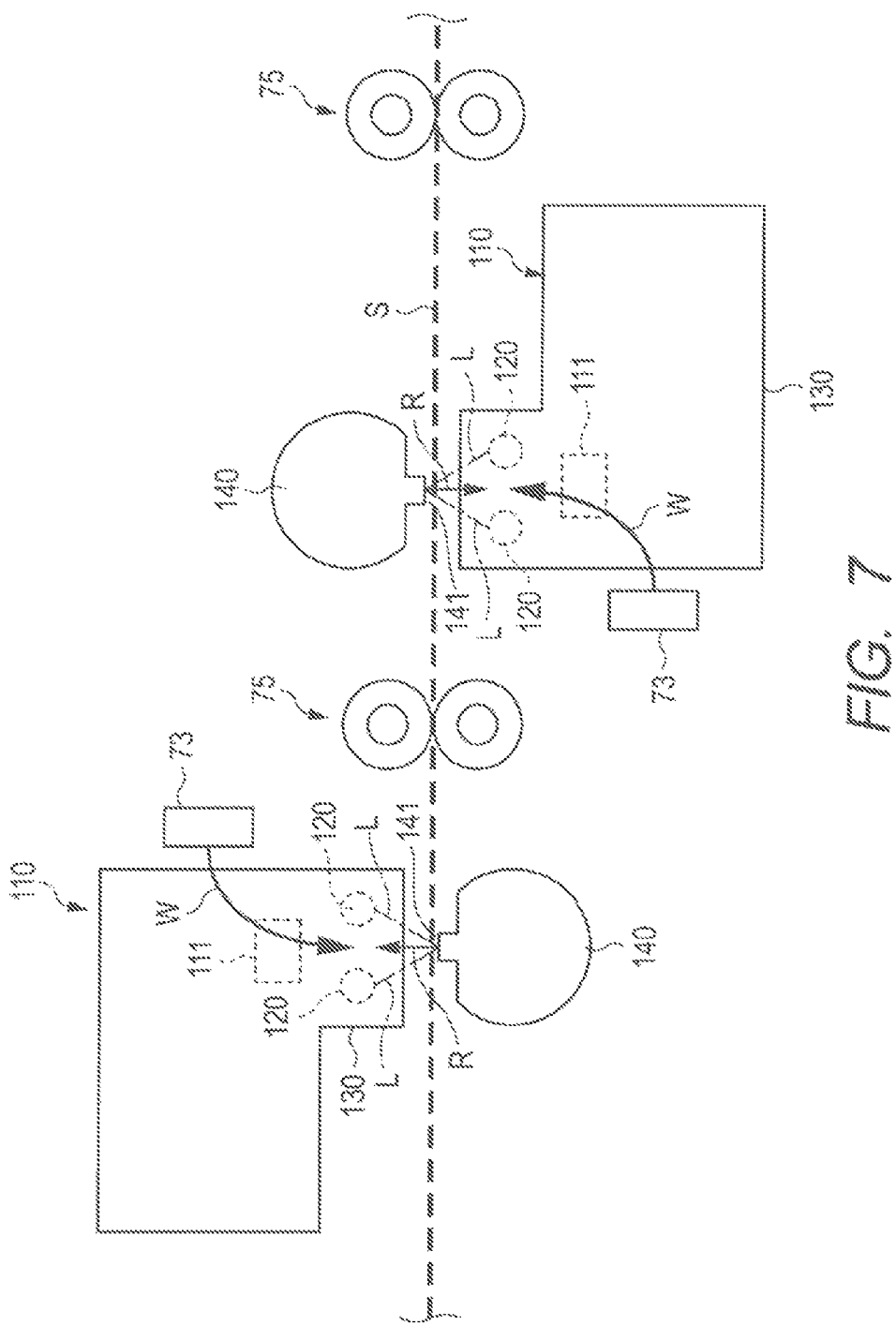
FIG. 7 is an enlarged view of a region around the reading section.

As illustrated in FIG. 7, two light emission sections 120 are provided side by side in the sheet conveyance direction in each reading section 110, and as illustrated in FIG. 6, each light emitting element 121 is disposed on substrate 123 provided on both sides in the sheet width direction.

Heat dissipation member 130 is disposed at a position on further outside of substrate 123 in the sheet width direction, and substrate 123 is disposed on heat dissipation member 130. Heat dissipation member 130 corresponds to the "heat dissipation section" of the embodiment of the present invention.

Figure 8:
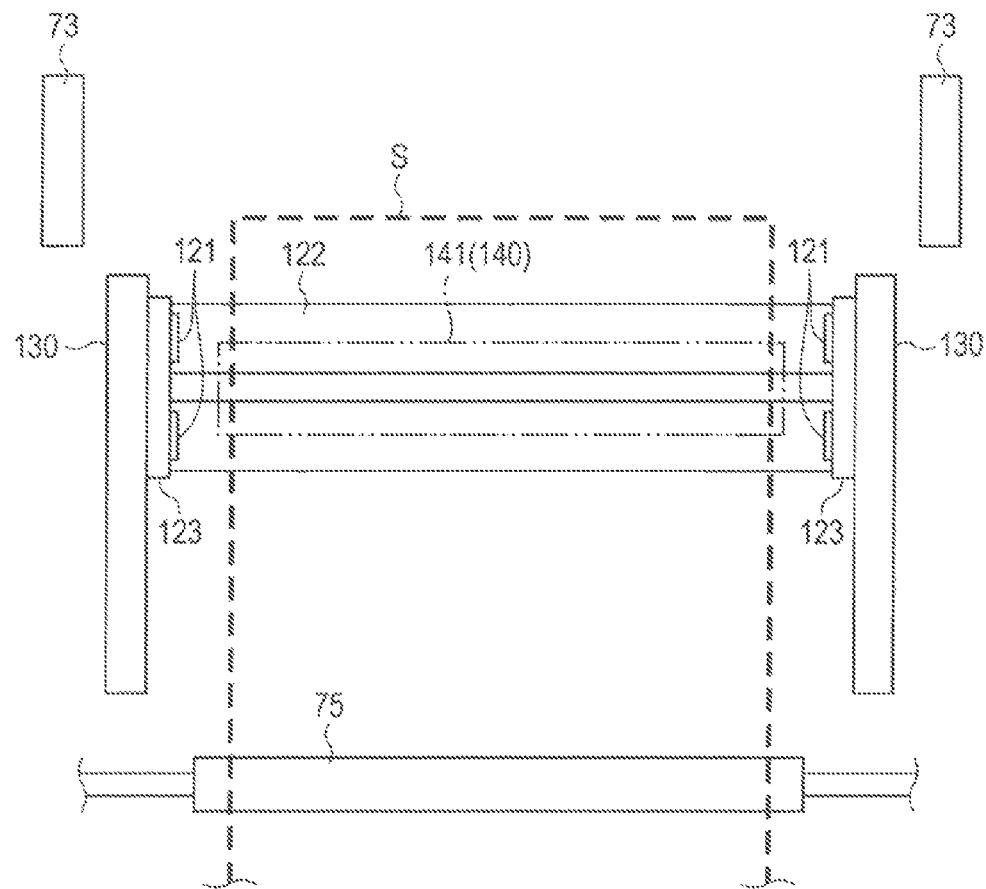
FIG. 8 illustrates a region around the light emission section as viewed from the upper side.

Heat dissipation member 130 is a member composed of a metal such as aluminum, and dissipates the heat transmitted from light emitting element 121. As illustrated in FIG. 8, the above-described fan 73 is provided on the side wall facing heat dissipation member 130 in the apparatus.

As illustrated in FIG. 7, fan 73 is disposed is on the side opposite to the conveyance surface of sheet S with respect to light emission section 120. Wind W jetted from fan 73 hits heat dissipation member 130 from the side opposite to sheet S with respect to light emission section 120 with a ventilation guide not illustrated. While an example configuration in which fan 73 jets wind W is described above, a configuration in which fan 73 absorbs air may also be employed.

When heat dissipation member 130 dissipates the heat of light emitting element 121 to the surroundings, the temperature of the region around the heat dissipation member 130 increases. When the temperature of the region around heat dissipation member 130 increases to a temperature close to that of heat dissipation member 130, the dissipation of the heat of light emitting element 121 by heat dissipation member 130 becomes difficult, and the temperature of light emitting element 121 is saturated, thus degrading light emission performance. However, in the present embodiment, light emitting element 121 is cooled through heat dissipation member 130 with wind W of fan 73, and consequently the light emission performance of light emitting element 121 can be maintained.

In addition, fan 73 uses the air in the apparatus, or more specifically, the air in a region around heat dissipation member 130, without introducing the air of the outside of the apparatus. In the present embodiment, it is only necessary to cool heat dissipation member 130 and therefore the size of fan 73 can be set to a relatively small size. Therefore, the size of the fan is not required to be increased for intake of a large amount of the external air, or a duct or the like for introduction of the external air is not required to be provided, and consequently, the size of the apparatus can be reduced.

In addition, backing member 140 provided at a position opposite to each light emission section 120 with sheet S therebetween. Backing member 140 is formed in a substantially columnar shape extending in the width direction of sheet S, and is provided with supporting part 141 that protrudes toward sheet S from the part facing sheet S.

Supporting part 141 can support sheet S being conveyed, and is located at an intermediate position between two light emission sections 120 in the conveyance direction in reading section 110 opposite to supporting part 141. Supporting part 141 faces imaging member 111 of reading section 110 through the gap between two light emission sections 120.

Two light emission sections 120 are set to emit light L toward supporting part 141. Supporting part 141 collects light L from two light emission sections 120 and reflects reflection light R in the vertical direction, that is, toward imaging member 111. Reflection light R is read by imaging member 111 through the gap between two light emission sections 120.

In the case where relatively thick sheet S is used, it is possible to reflect reflection light R toward imaging member 111 by applying light L to sheet S, but in the case where relatively thin sheet S is used, sheet S is easily bent, and therefore light L cannot be reflected only by sheet S. In view of this, by reducing the bending of sheet S with supporting part 141, it is possible to reflect light L as reflection light R toward imaging member 111 through supporting part 141.

Desirably, the surface of supporting part 141 facing sheet S is colored with black from the viewpoint of ensuing the ease of absorption of light L, and ensuing the ease of detection of foreign matters such as paper dust on a glass surface of reading section 110.

In addition, as illustrated in FIG. 8, light emitting element 121, heat dissipation member 130 and fan 73 are disposed at positions outside the sheet passing region of sheet S being conveyed in the width direction. Specifically, in the width direction, light emitting element 121, heat dissipation member 130 and fan 73 are disposed at positions outside supporting part 141 of backing member 140 and conveyance roller 75 provided in the apparatus. Conveyance roller 75 corresponds to the "conveyance member" of the embodiment of the present invention.

The operation and the effect of image reading apparatus 2 having the above-mentioned configuration will be described. Sheet S ejected from image forming apparatus 1 is brought into image reading apparatus 2, and conveyed toward reading section 110.

Sheet S having passed through the fixing nip has a high temperature (approximately 70° C.), and the sheet S advances through the apparatus while dissipating the heat thereof toward the interior of the apparatus having a temperature lower than that of the sheet S.

Therefore, for example, in the case where the light emission section of reading section 110 is of the array-type, the light emitting element facing sheet S is influenced by the dissipated heat of sheet S, and the heat thereof becomes difficult to be dissipated, thus reducing the light emission performance.

In addition, in the case of a light emission section of the array-type, a plurality of light emitting elements are used.

Therefore, in the above-mentioned case, in the case where a fan for introducing the external air into the apparatus is used to cool the entirety of a plurality of light emitting elements, the air jetting performance of the fan is required to be increased when sheets S are continuously conveyed for example, which leads to increase in size of the fan and the apparatus, for example.

However, in the present embodiment, light emission section 120 is of the light-guiding rod type, and light emitting element 121 is disposed at a position outside the sheet passing region of sheet S, that is, light emitting element 121 does not face sheet S, and consequently, light emitting element 121 is not easily influenced by the heat dissipated from sheet S. Further, since light emitting element 121 can be cooled by simply cooling heat dissipation member 130 disposed at a position outside the sheet passing region of sheet S with fan 73, the air volume of fan 73 can be set to a minimum value. Therefore, since the size of fan 73 is not required to be increased more than necessary, space-saving of the apparatus can be achieved while efficiently preventing the degradation of the light emission performance of light emitting element 121.

Incidentally, for the purpose of suppressing dissipation of heat from sheet S after fixation, it is in general conceivable to directly cool sheet S to forcibly cause the heat dissipation of the sheet S. However, when the wind of a fan or the like is directly applied to sheet S, the wind may become a resistance against the conveyance of sheet S depending on the direction of the wind.

For example, when the wind is applied in a direction perpendicular to the conveyance direction, the frictional resistance between sheet S and the guide member that guides sheet S increases depending on the air volume or the air velocity. In addition, when wind is applied from an end side of sheet S in a direction substantially parallel to the conveyance direction, the end side is raised by the wind and the end portion of sheet S is curled, and consequently, the wind becomes a resistance against the conveyance of sheet S.

When wind W of fan 73 is applied to sheet S in the above-mentioned manner, the wind becomes a resistance against the conveyance of sheet S, and therefore, it is not desirable to directly cool sheet S being conveyed. In view of this, for example, in the case where a light emission section of the array-type is used, when wind is applied to the light emitting element, the wind hits the sheet being conveyed, and it is therefore necessary to employ a duct separated from the sheet feeding path. When such a duct is provided, the size of the apparatus is further increased for the space of the duct.

However, in the present embodiment, light emitting element 121 and heat dissipation member 130 are disposed at positions outside the sheet passing region in the width direction of sheet S, and light emitting element 121 is cooled by cooling the heat dissipation member 130 from the external side of sheet S. With this configuration, wind W of fan 73 does not easily hit sheet S, and increase in size of the apparatus can be suppressed while preventing the wind from becoming a resistance of conveyance of sheet S.

In addition, fan 73 can directly cool heat dissipation member 130 disposed at a position outside the sheet passing region. Therefore, light emitting element 121 can be cooled while preventing wind W of fan 73 from becoming a frictional resistance of sheet S and the guide member.

In addition, since light emitting element 121 and heat dissipation member 130 are disposed at positions outside conveyance roller 75, that is, at positions outside relative to the sheet passing region of sheet S, it is possible to further reduce the influence of heat of sheet S on light emitting element 121 and heat dissipation member 130.

In addition, since light emitting element 121 and heat dissipation member 130 are disposed at positions outside backing member 140, it is possible to prevent the temperature of backing member 140 from being raised more than necessary due to the influence of the heat of light emitting element 121.

In addition, since light emitting element 121 can be cooled by cooling only the region around heat dissipation member 130, the size of fan 73 can be reduced. Therefore, increase in size of the apparatus can be further suppressed.

While light emitting elements 121 are provided at the both ends of light guiding member 122 in the width direction in the above-mentioned embodiment, light emitting element 121 may be provided at only one end of light guiding member 122 in the case where sheet S having a relatively small width is printed. It should be noted that, in view of handling sheets S of various sizes, it is desirable to provide light emitting elements 121 at the both ends of light guiding member 122.

While the image formation system in which image reading apparatus 2 is connected with image forming apparatus 1 is described in the above-mentioned embodiment, image forming apparatus 1 and image reading apparatus 2 may be separated members, or integrated members.

The embodiments disclosed herein are merely exemplifications and should not be considered as limitative. While the invention made by the present inventor has been specifically described based on the preferred embodiments, it is not intended to limit the present invention to the above-mentioned preferred embodiments but the present invention may be further modified within the scope and spirit of the invention defined by the appended claims.

Finally, an experiment for evaluation with image reading apparatus 2 according to the present embodiment will be described. In the experiment for evaluation, by use of image formation system 100 illustrated in FIG. 1, the color difference of a toner image in the case where the air velocity of fan 73 is varied was confirmed.

The experiment conditions include condition 1 in which the air velocity of fan 73 is 0 m/s, condition 2 in which the air velocity of fan 73 is 1.5 m/s, and condition 3 in which the air velocity of fan 73 is 5.0 m/s.

Figure 9:
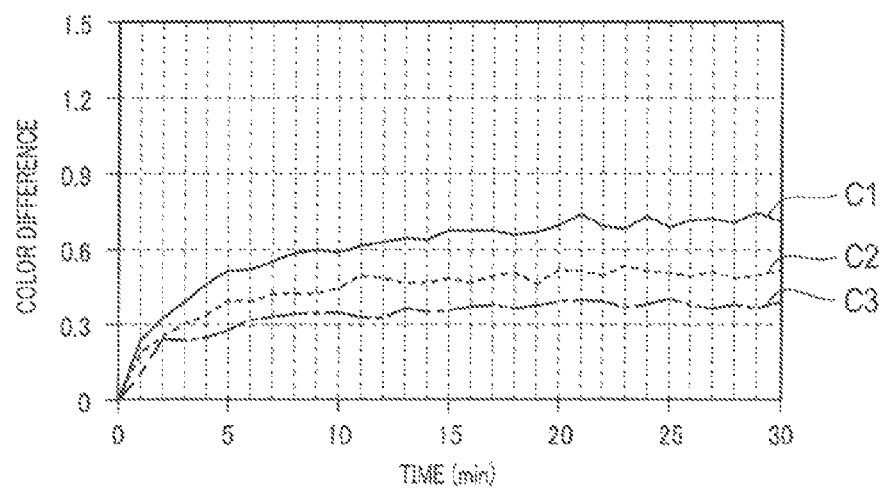
FIG. 9 shows results of an experiment for evaluation of the image reading apparatus according to the embodiment.

FIG. 9 shows results of the experiment for evaluation of image reading apparatus 2 according to the present embodiment. Solid line C1 indicates a result with condition 1, broken line C2 indicates a result with condition 2, and dashed line C3 indicates a result with condition 3.

As illustrated in FIG. 9, with each condition, the color difference was increased with time, and the values thereof become constant after the time point of 15 minutes. The color difference was approximately 0.7 under condition 1, approximately 0.5 under condition 2, and approximately 0.4 under condition 3.

It was confirmed from the above-mentioned results that, with condition 2 in which a relatively small air velocity is applied, the color difference can be improved by approximately 0.2 in comparison with condition 1 in which the air velocity is 0 m/s, and that, with condition 3 in which the air velocity is further increased, the color difference can be further improved.

What is claimed is:

1. An image reading apparatus comprising:
   a light emission section including
   a light emitting element configured to emit light, and a light guiding member configured to irradiate a sheet with light emitted from the light emitting element, the guiding member being a rod type light-guiding member;
a reading section configured to emit light from the light emission section to read an image formed on the sheet;
a heat dissipation section configured to dissipate heat of the light emitting element; and
a cooling section configured to cool the heat dissipation section, wherein
the light emitting element and the heat dissipation section are disposed at an end portion of the light guiding member in a longitudinal direction of the light guiding member and at positions outside a sheet passing region in the longitudinal direction, and
the cooling section is configured to blow wind directly on the heat dissipation section at the positions outside the sheet passing region from a direction orthogonal to the longitudinal direction.

2. The image reading apparatus according to claim 1, wherein the cooling section cools the heat dissipation section from a side opposite to a conveyance path of the sheet with respect to the light emission section.

3. The image reading apparatus according to claim 1, wherein
the light guiding member extends between a first end and a second end opposite the first end in the longitudinal direction,
the light emitting element is a first light emitting element and the light emission section further comprises a second light emitting element, and
the first light emitting element is disposed at the first end of the light guiding member in the longitudinal direction and the second light emitting element is disposed at the second end of the light guiding member in the longitudinal direction.

4. The image reading apparatus according to claim 1, wherein the cooling section cools the heat dissipation section by use of air in the image reading apparatus.

5. The image reading apparatus according to claim 1 further comprising:
a conveyance member configured to convey the sheet to a reading position at which the image formed on the sheet is read by the reading section, wherein
the light emitting element and the heat dissipation section are disposed at positions outside the conveyance member in the longitudinal direction.

6. The image reading apparatus according to claim 1 further comprising:
a backing member disposed to face the reading section on a side opposite to the reading section with respect to a conveyance path of the sheet, wherein
the light emitting element and the heat dissipation section are disposed at positions outside the backing member in the longitudinal direction.

7. The image reading apparatus according to claim 1, wherein the reading section includes:
a first reading section configured to read an image formed on a first surface of the sheet; and
a second reading section configured to read an image formed on a second surface of the sheet, the second surface being opposite to the first surface.

8. The image reading apparatus according to claim 7, wherein
the light emission section, the heat dissipation section and the cooling section are provided in the first reading section, and
the second reading section comprises:
a second light emission section including a second light emitting element configured to emit light and a second light guiding member configured to irradiate the sheet with light emitted from the second light emitting element, the second light guiding member being a rod type light-guiding member,
a second heat dissipation section configured to dissipate heat of the second light emitting element, and
a second cooling section configured to cool the second heat dissipation section.

9. An image formation system comprising:
an image forming apparatus configured to form an image on a sheet; and
the image reading apparatus according to claim 1 that reads an image of the sheet formed by the image forming apparatus.

10. The image reading apparatus according to claim 1, wherein the light emitting element is connected to the heat dissipation section via a substrate.

* * * * *